United States Patent [19]

Hostetler et al.

[11] Patent Number: 5,012,631
[45] Date of Patent: May 7, 1991

[54] BALE WRAPPER

[75] Inventors: Dewey L. Hostetler; David L. Lansdowne; Delmar Hostetler, all of Harper, Kans.

[73] Assignee: DewEze Manufacturing, Inc., Harper, Kans.

[21] Appl. No.: 457,491

[22] Filed: Dec. 27, 1989

[51] Int. Cl.⁵ .......................................... B65B 13/12
[52] U.S. Cl. ........................................ 53/588; 53/556
[58] Field of Search ................ 53/556, 588, 176, 211, 53/210, 587

[56] References Cited

U.S. PATENT DOCUMENTS

| | | | |
|---|---|---|---|
| 4,050,220 | 9/1977 | Lancaster et al. | 53/588 |
| 4,110,957 | 9/1978 | Lancaster et al. | 53/588 |
| 4,429,514 | 2/1984 | Lancaster et al. | 53/556 |
| 4,514,955 | 5/1985 | Mouser et al. | 53/588 |
| 4,553,374 | 11/1985 | Lancaster et al. | 53/588 |
| 4,593,518 | 6/1986 | Lancaster | 53/588 |
| 4,594,836 | 6/1986 | Good | 53/567 |
| 4,606,176 | 8/1986 | Cundall | 53/567 |
| 4,641,484 | 2/1987 | Popelka | 53/587 |
| 4,694,636 | 9/1987 | Griffin | 53/588 |
| 4,723,393 | 2/1988 | Silbernagel | 53/556 |
| 4,793,124 | 12/1988 | Anderson | 53/588 |

FOREIGN PATENT DOCUMENTS

3431628  3/1986  Fed. Rep. of Germany ........ 53/588

Primary Examiner—John Sipos
Attorney, Agent, or Firm—Litman, McMahon & Brown

[57] ABSTRACT

A bale wrapping apparatus having an infeed conveyor, a wrapping mechanism and an outfeed conveyor synchronized to convey bales through the apparatus while continuously wrapping a bale in the wrapping mechanism and forming a continuous protective cocoon around a row of bales. The wrapping mechanism includes a rotating cage and a pair of film dispensers that cooperatively wrap layers of film in successively overlapping helically wound paths around the bale. The apparatus is self-motivated when wrapping so as to discharge a continuous row of wrapped bales.

18 Claims, 6 Drawing Sheets

BALE WRAPPER

BACKGROUND OF THE INVENTION

The present invention relates to devices for wrapping hay bales with plastic for protection of the hay in the bale from the elements and, more particularly, to a self-propelled vehicle for continuously wrapping and discharging relatively large and cylindrically shaped hay bales.

Large hay bales have become very popular in many regions of the country as one large bale can be handled quite efficiently with the heavy equipment available on most farms, as compared to the very labor intensive work required to handle the many small bales required to feed to livestock to provide the equivalent feed as one large bale.

Initially, the large bales were not protected from the elements, but were stored where they were made or at another outside site. With such outdoor storage, there is normally a spoilage of ten percent or more of the bale due to weathering and mostly due to water damage. To reduce or eliminate this spoilage, farmers have tried to cover or otherwise protect the bales from the weather. However, most of the previous methods used have used materials that are relatively expensive, the methods have been very labor intensive or the methods have been ineffective due to damage to the product or due to failure to adequately protect the bale.

In particular, some prior methods and apparati for covering cylindrical hay bales with plastic have included depositing a bale in a plastic bag or rotating a bale on a turntable and swathing the bale with a sheet of plastic. Both of these methods have disadvantages. Bales are rarely precisely the same shape. Therefore, a plastic bag must be large enough to handle larger bales. If a smaller bale is placed in such a bag, it will tend to catch on other objects, such as the bale handling device, and tear. Bagging individual bales or placing individual bales on a single rotating table are both time consuming processes, requiring the covering of each bale on all sides. In each of these methods, the wrapped bale must usually be moved to another location for storage, increasing the chance of tearing the plastic and exposing the bale to the elements.

It is noted that various methods and mechanisms for generally wrapping cylindrical loads have been utilized for many years. In one such method, a conveyor was used to transport a load to a wrapping mechanism that rotated about the load, covering the load with a plurality of layers of stretched film. A second conveyor then transported the wrapped load away from the wrapping mechanism to a storage location. Such a mechanism has numerous problems when applied to a large hay bale, including that it is difficult with such a device to hold the load during wrapping in such a way as to not interfere with the wrapping process nor damage the load or the wrapping material. Furthermore, such a mechanism does not take into account the special requirements for handling and storing hay bales in a field.

It is also desirable to have a bale wrapping apparatus that is mobile and easily transported to the bales and that is self-propelled during use to avoid the need of having other farm machinery motivate the apparatus while such other machinery may be needed for other purposes.

SUMMARY OF THE INVENTION

The bale wrapper of this invention includes a self-propelled wheeled vehicle having an infeed conveyor, bale wrapping mechanism, outfeed conveyor and ramp mounted thereon.

Preferably, the infeed conveyor includes two longitudinal rails having slip chains mounted thereon that rotate around the rails, conveying a load to the bale wrapping mechanism. A trigger bar located between the rails activates the infeed conveyor when a bale is placed thereon. Smooth support bars extend from the rails and hold a bale during the wrapping process and slide easily from between the bale and plastic when the wrapped bale is conveyed from the bale wrapping mechanism by the outfeed belt conveyor that slopes toward the ground. A small ramp extends between the outfeed conveyor and the ground.

The bale wrapping mechanism includes a circular rotatable device having two spaced rings adapted for passage of a bale therethrough with two plastic dispensing and stretching mechanisms mounted thereon and extending between the rings. The dispensing and stretching mechanisms are located on opposite sides of the rotatable device and each include a plastic roll dispenser and two spaced stretching rollers. The plastic is reeved between the rollers with the downstream roller connected to the upstream roller such that the downstream roller rotates faster, causing the plastic film to stretch between the rollers prior to wrapping a bale. The rings are slidingly mounted on rollers and rotate around a bale during the wrapping process, covering the bale with a plurality of layers of stretched plastic film.

Hydraulic motors are provided allowing an operator to independently drive three portions of the bale wrapper: (1) the infeed conveyor, (2) the rollers for the wrapping mechanism and (3) the outfeed conveyor and vehicle wheels.

OBJECTS OF THE INVENTION

Therefore, the objects of the present invention are: to provide an apparatus for wrapping relatively large hay bales with plastic film or the like to protect the bales from the elements; to provide such an apparatus which is mobile; to provide such an apparatus that continuously wraps a row of bales so that the ends of each bale do not have to be separately sealed; to provide such an apparatus that is self-motivated when in use wrapping bales; to provide such an apparatus which is not labor intensive and requires only relatively inexpensive plastic film that is readily available in rolls; to provide such an apparatus that covers the bales with a layer of film quickly and efficiently; and to provide such an apparatus that is relatively easy to use, inexpensive to construct and particularly well adapted for the intended usage thereof.

Other objects and advantages of this invention will become apparent from the following descripton taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

FIGS. 1 through 17 generally illustrate a bale wrapper apparatus in accordance with the present invention, generally designated by the reference numeral 1, for wrapping and depositing on the field a row 3 of wrapped bales 4. The apparatus 1 generally includes a wheeled vehicle 5, an infeed conveyor 7, a bale wrapping mechanism 9, a pair of support rods 11, an outfeed conveyor 13, a ramp 15 and a towing mechanism 17. The vehicle 5, wrapping mechanism 9 and the conveyors 7 and 13 are powered by self-contained motor means such as the illustrated combustion engine 19 mounted on the vehicle 5.

Figure 2:
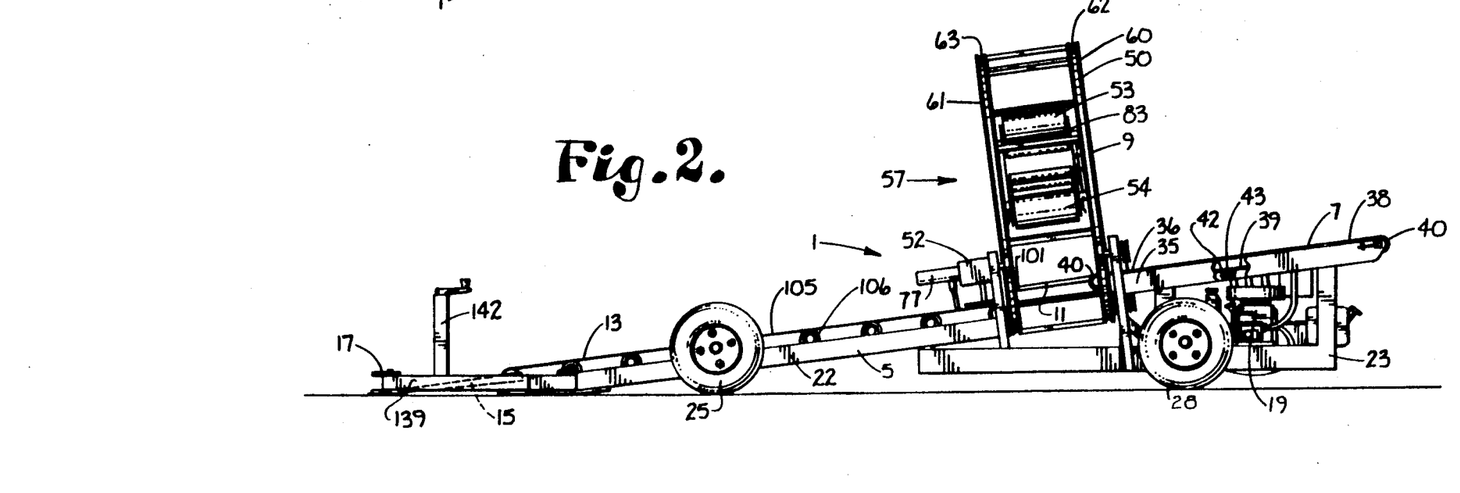
FIG. 2 is a side elevational view of the apparatus with the ramp shown in phantom lines.
Figure 3:
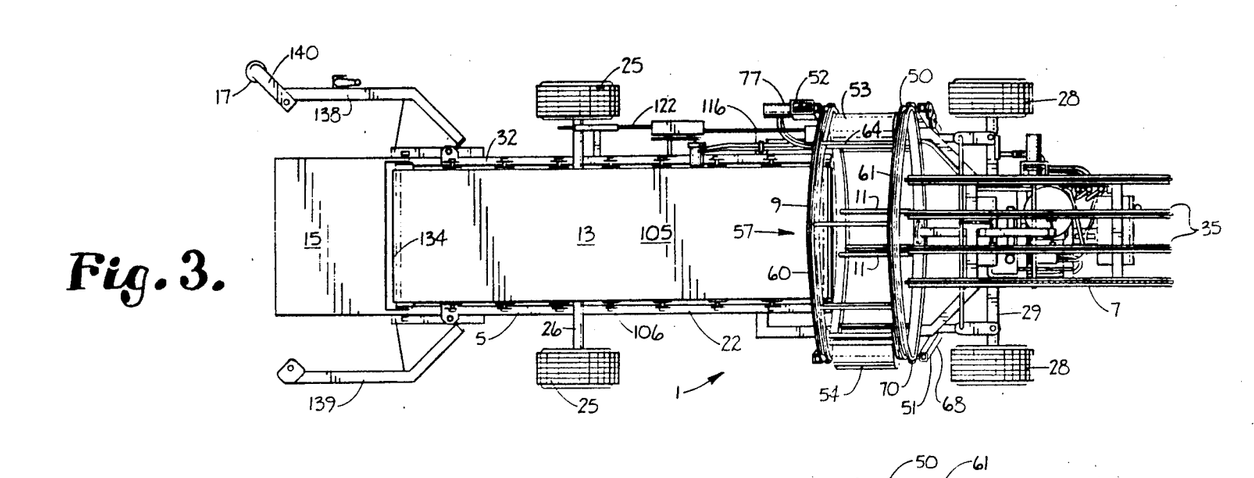
FIG. 3 is a top plan view of the apparatus.
Figure 4:
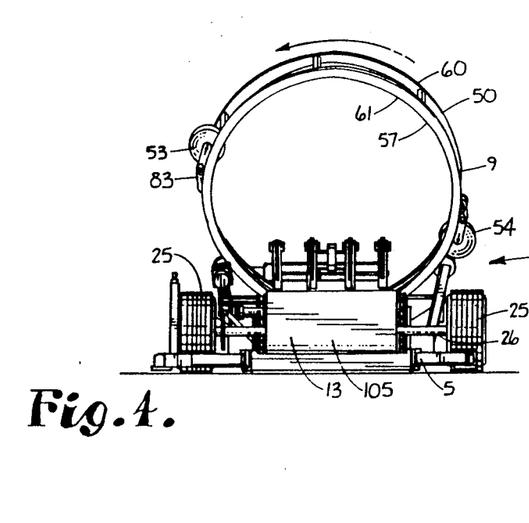
FIG. 4 is a rear elevational view of the apparatus.

The vehicle 5 includes frame means, such as illustrated frame structure 22, which is generally positioned at an acute angle with respect to the ground when in a bale wrapping orientation thereof, as is shown in FIG. 2. Depending from a front portion (as is used herein, the term "front" is to the right in FIG. 2) of the frame structure 22 is a motor support 23 upon which is mounted the engine 19. Also pivotally mounted on the motor support 23 is a set of front transport wheels 28 connected by an axle 29. Mounted on the rear portion of the frame structure 22 is a set of rear transport wheels 25 pivotally mounted upon an axle 26. The axles 26 and 29 are generally parallel to one another. The front axle 29 is attached to a vertically aligned journal 30 and can be rotated where necessary to steer by use of a lever arm 34, seen in FIG. 14.

The frame structure 22 has a front segment 31 and a rear segment 32. The front segment 31 and rear segment 32 being fixedly held in position relative to one another by the motor support 33. A gap 23 exists between the front segment 31 and rear segment 32 which allows bales 4 to be wrapped, as will be described later.

The infeed conveyor 7 is mounted on the top of the frame structure front segment 31. The infeed conveyor 7 comprises four spaced rails or chain guides and supports 35, each carrying a chain 36 driven by a chain drive means such as the illustrated chain drive mechanism 37. It is forseen that more or fewer chains 36 may be used. The chains 36 each have an upper flight 38 that extends slightly above a corresponding guide and support 35. Each of the chains 36 also has a return flight 39 which extends through the associated guide and support 35.

Each chain 36 rotates upon a pair of idler sprockets 40, each of which is mounted in an opposite end of the guide and support 35 associated with the chain 36. Each chain 36 also has a drive sprocket 42 associated therewith which is mounted on a drive shaft 43. The drive shaft 43 is, in turn, rotatably mounted upon the frame structure front segment 31 and operably driven by engine 19 operating through a hydraulic motor 46.

Each of the chain upper flights 38 ride in a depressed track 47 in an associated chain guide and support 35 so as to maintain the chains 36 upon their respective supports 35 during rotation of the chains 36. The chain guide and supports 35 are parallel aligned and cooperate with the drive sprockets 42 and drive shaft 43 such that, when the drive shaft 43 is rotated, the chains 36 are driven along parallel paths at substantially identical speeds.

Figure 1:
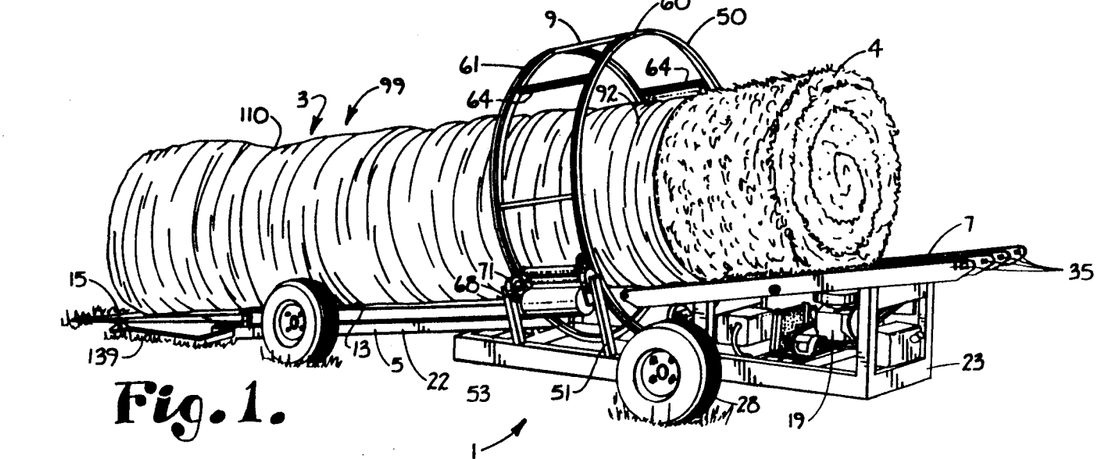
FIG. 1 is a perspective view of a bale wrapper apparatus in accordance with the present invention including a vehicle with an infeed conveyor, a wrapping mechanism, an outfeed conveyor, a ramp and a towing device, shown with wrapped and unwrapped hay bales thereon.

The speed of the chains 36 are coordinated with the rotational speed of the bale wrapper mechanism 9 and the outfeed conveyor 13, as will be discussed in greater detail below, such that bales 4 are conveyed through the apparatus 1 at a rate to optimize wrapping of the bales 4 and such that the bales 4 are ejected from the apparatus 1 in a continuously wrapped row 3 as is being initiated in FIG. 1. As the bale row 3 exits from the apparatus 1, the row 3 is placed upon the ground in close end-to-end relationship to each other and is continued until all of the bales 4 are wrapped and in the row 3 or the operator runs out of room and must initiate a new row 3.

The bale wrapping mechanism 9 is mounted on the frame structure 22 between the front segment 31 and rear segment 32. The bale wrapping mechanism 9 includes a ring-like or cylindrical cage 50, a support structure 51, a drive mechanism 52 and a pair of wrapping stations 53 and 54.

Figure 5:
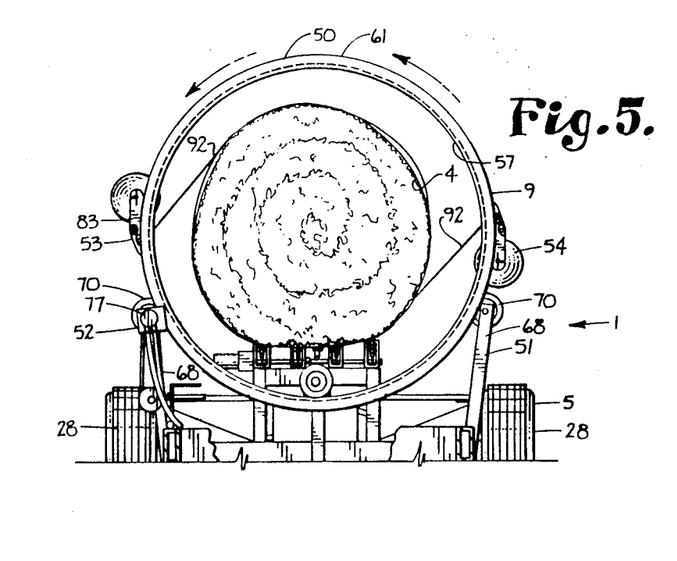
FIG. 5 is an enlarged and fragmentary front elevational view of the apparatus shown wrapping a bale.

The cage 50 is a circular or cylindrical structure having an axial passage 57 extending entirely therethrough sufficiently large to allow a bale 4 to pass through the center of the cage 50, as seen in FIG. 5. The cage 50 includes a pair of parallel spaced circular channel beams 60 and 61 having outwardly facing channels 62 and 63 respectively and being connected by a plurality of spacing struts 64.

The cage support structure 51 includes four stanchions or upright members 68 which are each fixedly attached to the frame structure 22 near a lower end thereof and which each have a wheel 70 rotatably connected to an upper end thereof so as to extend above the upright member 68. The wheels 70 are spaced and aligned so as to be received in the channels 62 and 63 of the channel beams 60 and 61. In particular, a front set of the wheels 70 is received in the front channel 62 and a rear set of wheels 70 is received in the rear channel 63. The wheels 70 support and allow rotation of the cage 50 thereupon.

Figure 13:
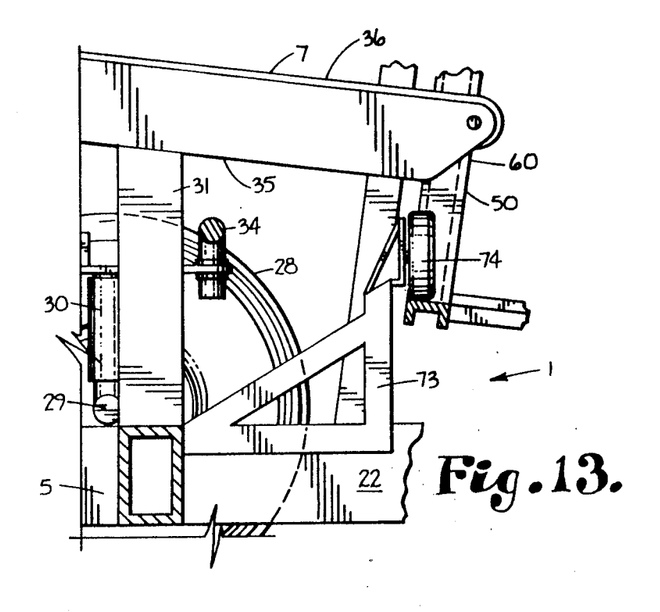
FIG. 13 is an enlarged and fragmentary cross-sectional view of a portion of the wrapping mechanism of the apparatus.

The support structure 51 also includes a triangular support bracket 73 secured to the frame structure 22 and having a keeper wheel 74 rotatably attached to the upper end thereof, as seen in FIG. 13. The keeper wheel 74 rides on the inside of the front channel beam 62 to assist in ensuring that the cage 50 remains supported by the wheel 70 and that the wheels 70 do not disengage from their respective channels 62 and 63 during operation or transport.

The cage drive mechanism 52 comprises a hydraulic motor 77 operably driven by the engine 19. The cage motor 77 directly rotates one of the wheels 70, which is seen as the rearward and closest wheel 70 in FIG. 8. The motor 77 is also connected by a pair of drive belts 79 through a pulley shaft 80 mounted on a pair of the upright members 68 to a second one of the wheels 70 which is the frontward and closest wheel 70 in FIG. 8. In this manner, the hydraulic motor 77 operably rotates at least two of the wheels 70 such that, when these wheels 70 are rotated, the cage 50 is operably rotated about a central axis thereof.

Figure 6:
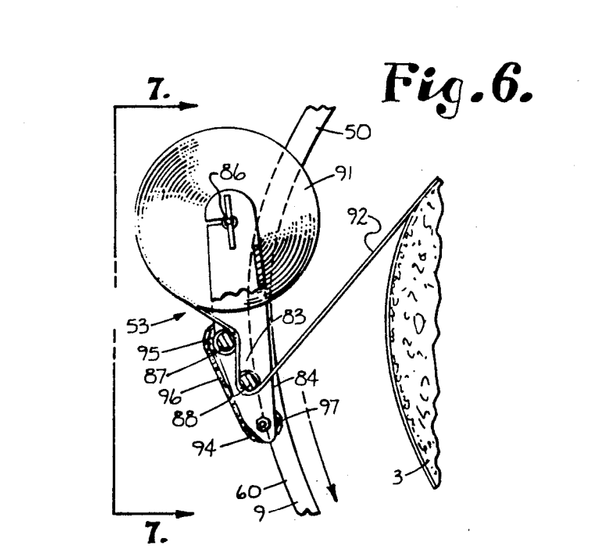
FIG. 6 is an enlarged and fragmentary cross-sectional view of a portion of the wrapping mechanism of the apparatus.
Figure 7:
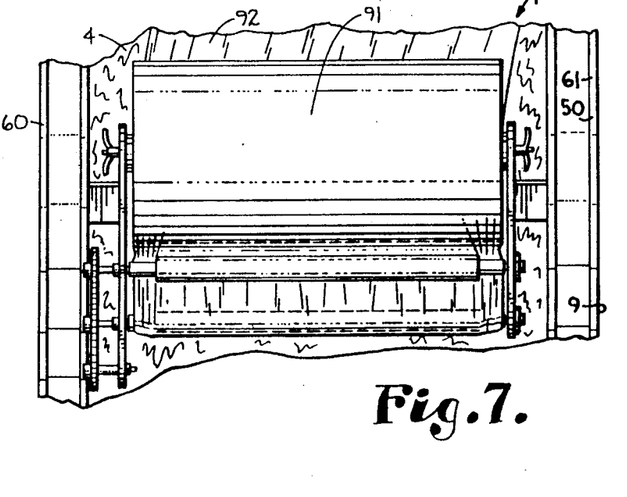
FIG. 7 is an enlarged and fragmentary cross-sectional view of a portion of the wrapping mechanism taken along 7—7 of FIG. 6.

The wrapping stations 58 are perhaps best illustrated in FIGS. 5 and 6. Each wrapping station 53 and 54 includes a carrier bracket 83 fixedly attached to the cage 50 and, in particular, to one of the struts 64 at substantially diagonally opposed locations on the cage 50. Each carrier bracket 83 includes a pair of support arms 84 having three parallel shafts 86, 87 and 88 mounted upon and extending therebetween.

A roll of wrapping material 91, such as the illustrated roll of relatively thin plastic film 92, is rotatably mounted on the shaft 86. The shafts 87 and 88 are mounted in spaced relationship to the roll of wrapping material 91 and the film 92 is reeved over the shaft 87 and under the shaft 88, as seen in FIG. 6. The shafts 87 and 88 are connected by a drive chain 94 through sprockets 95 and 96 on each of the shafts 87 and 88 respectively. The sprocket 95 is somewhat smaller in diameter than the sprocket 96 so that the shafts 87 and 88 rotate at different speeds thereby stretching the film 92 therebetween. The drive chain 94 is also reeved over an idler sprocket 97 and effectively provides a continuous tension to the film 92.

Figure 8:
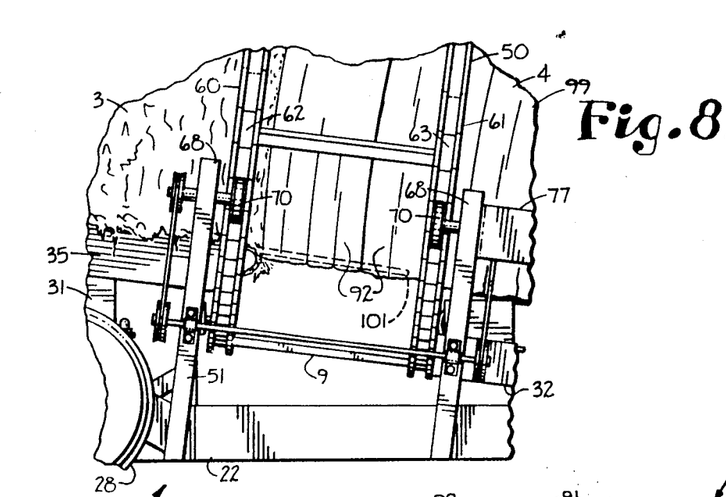
FIG. 8 is an enlarged and fragmentary side elevational view of a portion of the wrapping mechanism of the apparatus shown with a partially wrapped bale.
Figure 9:
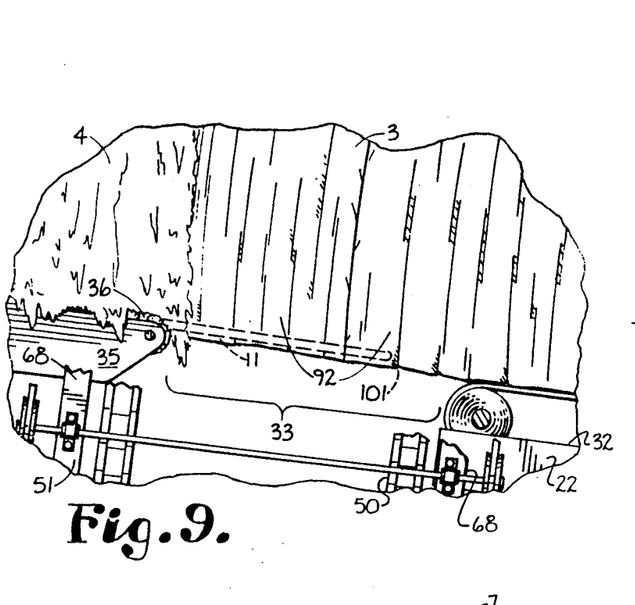
FIG. 9 is an enlarged and fragmentary side elevational view of a portion of the wrapping mechanism of the apparatus showing a partially wrapped bale with a support bar shown in phantom lines.
Figure 10:
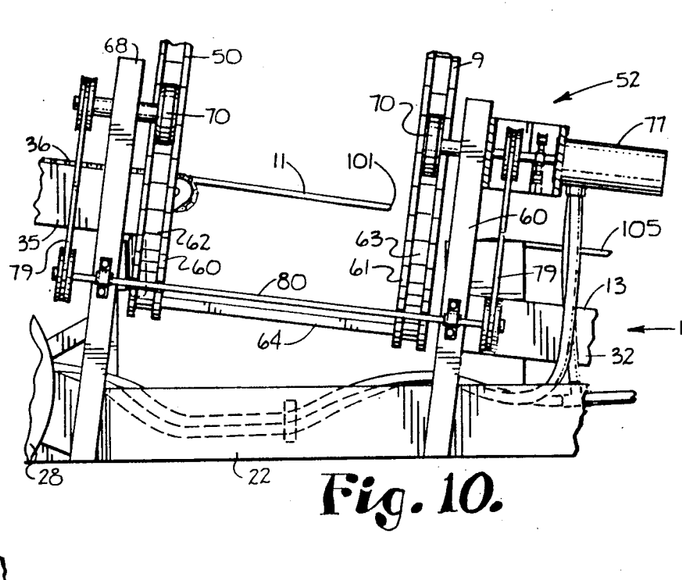
FIG. 10 is an enlarged and fragmentary side elevational view of a portion of the wrapping mechanism of the apparatus with a portion of the hydraulic system shown in phantom lines.

The film 92 from each of the wrapping stations 53 and 54 is wound about the bales 4 as the cage 50 rotates around a bale 4 positioned within the cage 50, such as is seen in FIG. 8. The plastic films 92 are wrapped in a generally flat helical fashion about the bale 4 as it is continuously and constantly driven through the cage at a fixed speed relative to the rotation of the cage 50. The two films 92 are placed in an overlapping fashion relative to one another upon each bale 4 so that each film 92 overlaps the other film 92 by approximately fifty percent. In this manner, a continuous never ending cocoon 99 can be formed for as many bales 4 as are desired to place in the row of bales 3.

The film 92 can be constructed of any type of weather impervious material, but is preferably plastic, as shown, and of a type which is very readily and cheaply available. For example, the film 92 may be polyvinylchloride, polyethylene, polypropylene and other available plastics or even cloth or paper treated to be weather resistant. The illustrated embodiment shows a film 92 that is "polyvinyl" that is approximatey twenty inches in width and sold under the trademark Saran Wrap. This film has a stretch of approximatley fifty-five percent when being unreeved from the rolls 91 and passing between the shafts 87 and 88.

The cage 50 is positioned in the gap 33 between the frame structure front segment 31 and rear segment 32. Such positioning allows the cage 50 to rotate and the film 92 to be wrapped about each bale 4 without interference from the frame structure 22. However, each bale 4 must be partially supported as the bale 4 passes over the gap 33 to prevent the front edge of the bale 4 from becoming jammed and to prevent the bale 4 from sagging in general.

For this purpose, the support rods 11 extend in the direction of travel of the bale 4 across the gap 33 and are positioned so as to support each bale 4, as the bale 4 traverses the gap 33. Each of the rods 11 are fixedly secured to the frame structure front segment 31. The distal end 101 of each rod 11 terminates slightly before and above the outfeed conveyor 13. During operation, as the bales 4 are wrapped by the film 92, the film 92 wraps around the rods 11 and slides axially with respect to the rods 11 as the bales 4 are conveyed through the gap 33. In this manner, the film 9 continuously slides along the rods 11 so that the film 92 is not substantially disturbed by the rods 11 but remain intact around the bales 4 as the bales 4 are transferred to the outfeed conveyor 13.

The outfeed conveyor 13 comprises a continuous conveyor belt 105 supported by a plurality of rollers 106 rotatably mounted upon the frame structure rear segment 32. The outfeed conveyor 13 also includes a drive mechanism 108 having a hydraulic motor 109 operably driven by the engine 19. The hydraulic motor 109 is mounted upon the frame structure rear segment 32 and includes hydraulic hoses or conduits 111 from a hydraulic system 112 driven by the engine 19. A drive shaft 113 of the motor 109 has mounted thereupon a first drive gear or pulley 115 connected by a drive belt 116 with a second drive gear or pulley 117 axially connected to and operably rotating a front roller 118 so as to operably rotate the conveyor belt 105. A third drive gear or pulley is operably connected by a drive chain to a fourth pulley 123 fixedly attached to the rear axle 26 so as to operably drive the rear transport wheels 25 when the motor 109 is operating. The motor 109 is coordinated and synchronized with the cage motor 77 and the infeed conveyor motor 46 so as to synchronize movement of the bales 4 along the apparatus 1, such that the bales 4 are moved at a fixed rate of speed with respect to the wrapping of the film 92 about the bales 4 by the wrapping mechanism 9 and so that a uniform and continuous layer of film 92 is placed upon the bales 4 including covering a seam 110 between two adjacent bales 4.

Figure 11:
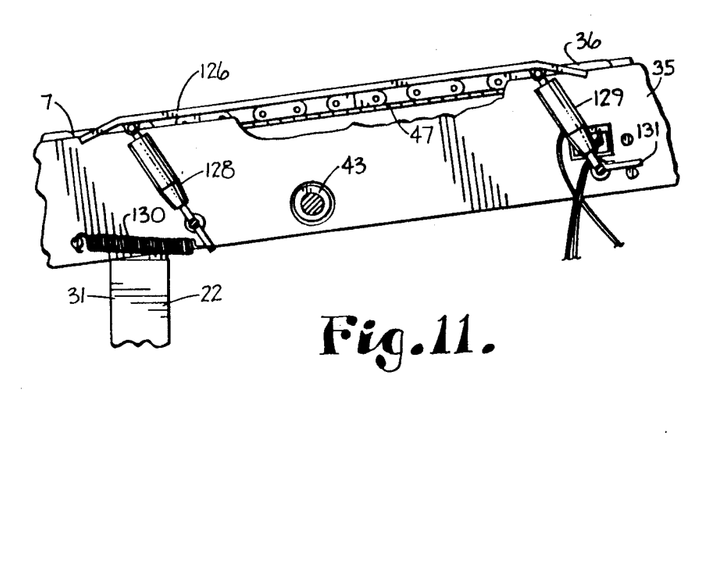
FIG. 11 is an enlarged and fragmentary cross-sectional view of a portion of the infeed conveyor of the apparatus showing a conveyor triggering mechanism in an upright, off position.
Figure 12:
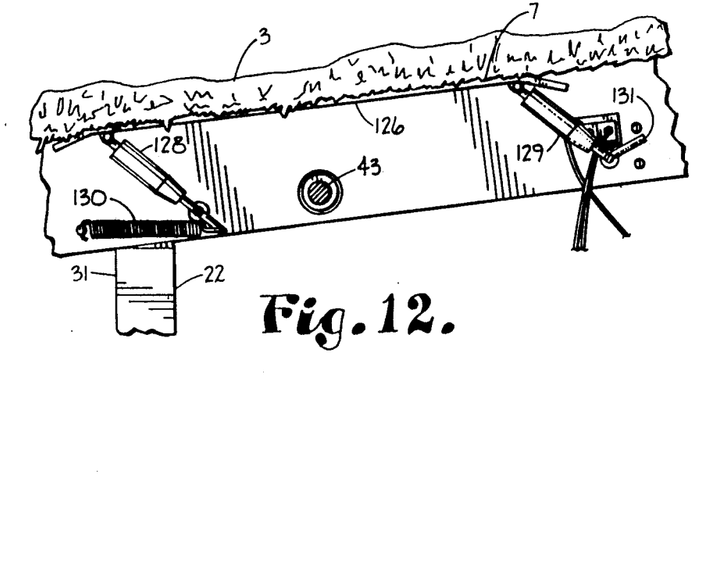
FIG. 12 is an enlarged and fragmentary cross-sectional view of a portion of the infeed conveyor of the apparatus showing a bale thereon depressing the triggering mechanism that automatically advances the bale along the conveyor.

The bales 4 are originally placed upon the infeed conveyor 7 by a loading tractor or the like (not shown) and it is possible that bales 4 would not be continuously available to the wrapping mechanism 9. Consequently, a stop/start mechanism 126 is provided to control the hydraulic system 112 supplying the motors 46, 77 and 109. The stop/start mechanism 126 is seen in FIGS. 11 and 12. The stop/start mechanism 126 includes an upper slide plate 127 positioned to engage a bale 4 placed upon the infeed conveyor 7, as shown in FIG. 12. When the bale 4 engages the slide plate 127, the plate is depressed, thereby rotating the plate 127 upon a pair of arms 128 and 129 supporting the plate 127. The arm 128 is pivotally mounted upon the frame structure 22 and is biased by a spring 130 to urge the plate 127 upwardly. The arm 129 is also pivotally mounted upon the frame structure 22 and has a lower end pivotally connected to a control rod 131 operably triggering the hydraulic system 112 to start operation of the motors 46, 77 and 109, when the plate 127 is depressed and stopping the hydraulic system 112 when the plate 127 rises due to a biasing action of the spring 130 because there is no bale 4 present to depress the plate 127.

During operation, the bales 4 are conveyed from the wrapping mechanism 9 along the outfeed conveyor 13 to the discharge ramp 15. A roller 136 is attached to the frame structure 22 and spaced beneath the ramp 15 to allow the frame structure 22 to smoothly roll along the ground during discharge of bales 4 from the apparatus 1. The ramp 15 and roller 136 are mounted upon the frame structure rear segment 32.

Figure 15:
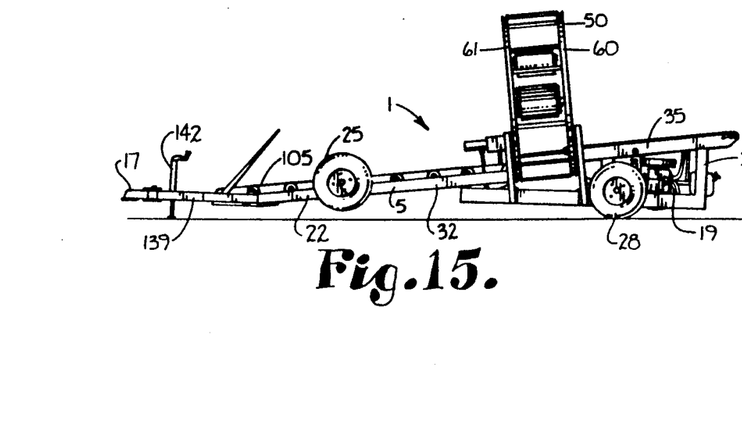
FIG. 15 is a side elevational view of the apparatus with the ramp and tow mechanism shown in a towing position.
Figure 16:
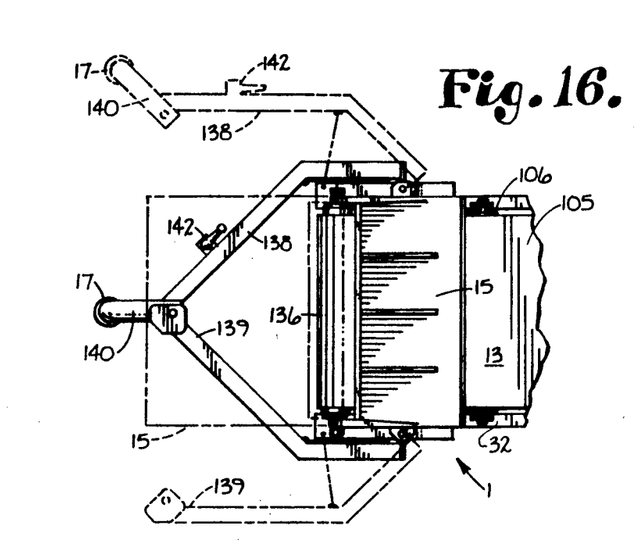
FIG. 16 is an enlarged and fragmentary top plan view of the apparatus showing a portion of the outfeed conveyor, the ramp and the towing mechanism with the towing mechanism shown in a towing position in solid lines and a bale advancing position in phantom lines.
Figure 17:
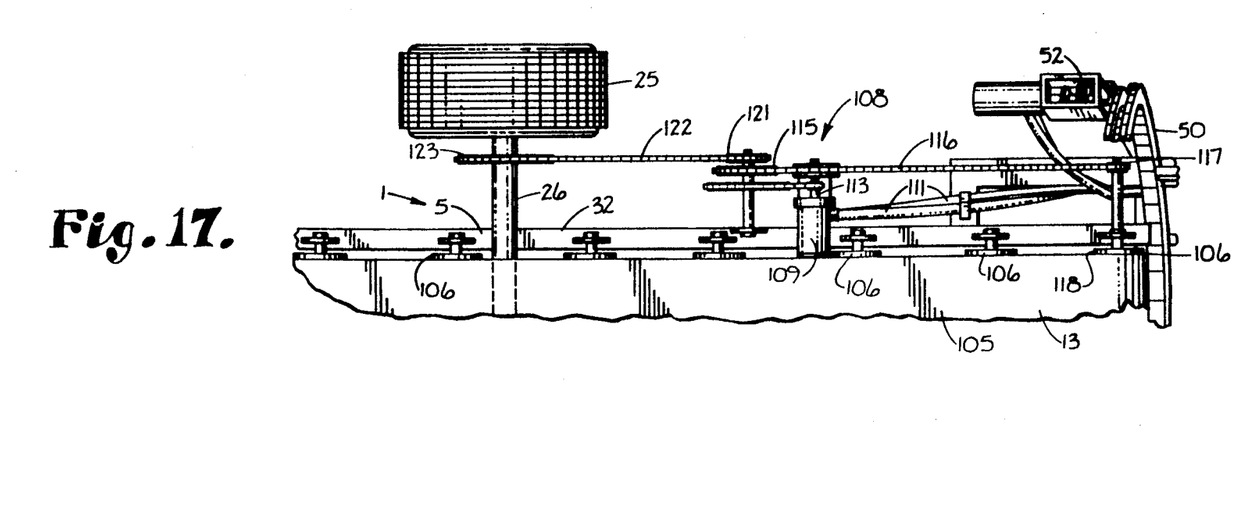
FIG. 17 is an enlarged and fragmentary top plan view of a portion of the outfeed conveyor of the apparatus.

The towing mechanism 17 includes a pair of swingable arms 138 and 139 and a hitch 140. The arms 138 and 139 are pivotally attached to the frame rear segment 32 at one end thereof and have a rearward distal end which can be joined together as shown in FIG. 16 in solid lines and locked by a pin 141. The hitch 140 is attached to the distal end of the arm 138 and extends rearward when the two arms 138 and 139 are joined together. The arm 138 also includes a jack 142 which may be operably used to raise the rear end of the apparatus 1 as shown in FIG. 15 to allow the hitch 140 to be placed over and secured to a trailer hitch of an over-the-road transport vehicle (not shown). During use of the apparatus 1 to wrap bales 4, the arms 138 and 139 are swung outwardly, as is shown in phantom lines in FIG. 16 to prevent the arms 138 and 139 from interfering with conveyance of the bales 4 from the apparatus 1.

Figures 14, 18:
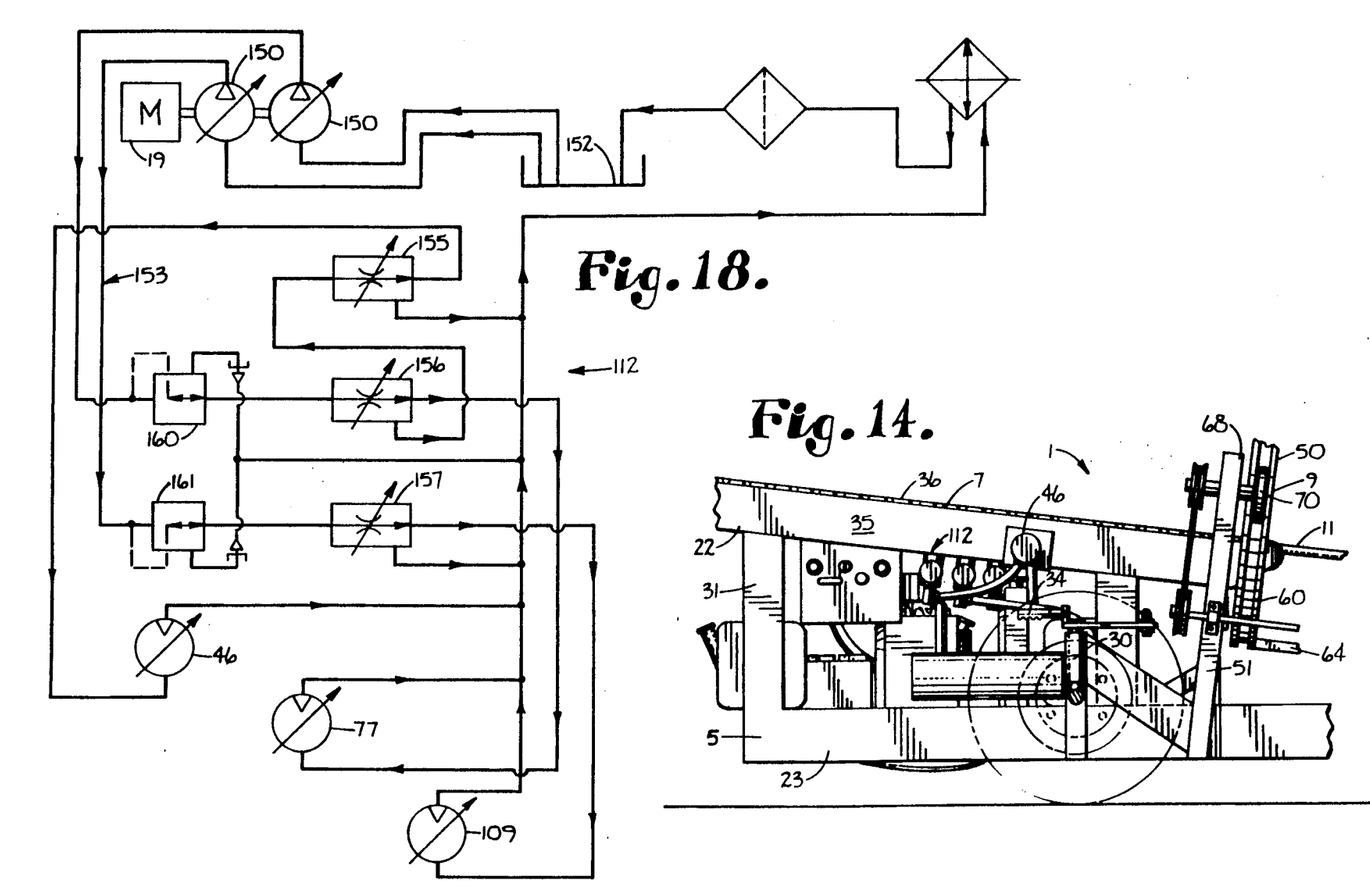
FIG. 14 is an enlarged and fragmentary side elevational view of a portion of the vehicle and infeed conveyor of the apparatus showing a steering mechanism for the vehicle.
FIG. 18 is a schematic of the hydraulic system of the apparatus.

The engine 19 drives the hydraulic fluid system for 112 which includes parts that are readily available hydraulic system is generally shown in FIG. 18 and includes a pair of hydraulic pumps 150 driven by the engine 19. The pumps 150 pressurize hydraulic fluid from an oil reservoir 152 which, in turn, flows through a conduit system 153 to flow control valves 155, 156 and 157 and subsequently to motors 46, 47 and 109. A pair of relief valves 160 and 161 prevent overpressure of the conduit system 153 and relieve fluid back to the oil reservoir 152. Also, any excess discharge from the valves 155, 156 and 157 and flow from the motors 46, 77 and 109 is returned to the reservoir 152.

During operation, bales 4 are placed on the infeed conveyor 107. When the control mechanism 126 is triggered by a bale 4 depressing the slide plate 127, the motors 46, 77 and 109 are triggered to synchronize movement of the bale or bales 4 through the wrapping mechanism 9 and to helically wrap the film 92 thereabout in an overlapping fashion and, thereby, protect the bales 4 and to form a continuous row of bales 3 in a single cocoon 99 discharging from the apparatus 1. It is noted that, when the first bale 4 of the row 3 passes through the wrapping mechanism 9, an operator must initially attach the two films 92 to the bale prior to starting the apparatus 1. As the bales 4 are discharged from the apparatus 1, the rear transport wheels 25 are rotated so as to also drive the apparatus 1 forward in synchronization with the bale 4 leaving the apparatus 1 so that the row of bales 3 is laid upon the ground in a continuous uniform path without substantial separation between the bales 4 within the row 3.

It is to be understood that while certain forms of the present invention have been illustrated and described herein, it is not to be limited to the specific forms or arrangement of parts described and shown.

What is claimed and desired to be secured by Letters Patent is as follows:

1. An apparatus for wrapping hay bales with a web of weather resistant material comprising:
   (1) an elongate frame;
   (b) infeed conveyor means mounted on said frame and adapted to receive upwrapped bales;
   (c) bale wrapping means mounted on said frame adjacent to said infeed conveyor means; said bale wrapping means for wrapping a continuous web in a helical path about a series of bases so as to form a row of bales in a single protective cocoon of said web material; said infeed conveyor means adapted to transport bales to said bale wrapping means and urge bales through said bale wrapping means;
   (d) outfeed conveyor means mounted on said frame adjacent to said wrapping means for receiving bales from said wrapping means, controlling the speed of bales being transported through said wrapping means resulting in a uniform and continuous wrapping of said web material about the bales and transporting wrapped bales to the ground; and
   (e) motor means for operatively motivating said infeed conveyor means, said bale wrapping means and said outfeed conveyor means; said motor means also operatively propelling said elongate frame during bale wrapping so as to synchronize the discharge of bales from the apparatus to place wrapped bales in generally adjacent end-to-end relationship within the cocoon of the web material; and (f) control means cooperating with said motor means for independently driving:
   (1) said infeed conveyor means;
   (2) said wrapping means;
   (3) said elongate frame; and
   (4) said outfeed conveyor means.

2. The apparatus according to claim 1 wherein said infeed conveyor means includes:
   (a) triggering means located on said infeed conveyor means and adapted to automatically start said conveyor means when a bale is placed thereon and to stop said conveyor means when all bales on said conveyor means have been conveyed past said triggering means to said wrapping means.

3. The apparatus according to claim 1 wherein said infeed conveyor means includes:
   (a) first and second parallel elongate rails;
   (b) first and second slip chains mounted on said rails and adapted to rotate therearound; and
   (c) an infeed conveyor drive mechanism to operably drive said chains.

4. The apparatus according to claim 1 wherein:
   (a) said bale wrapping means is positioned substantially in a gap between said infeed conveyor means and said outfeed conveyor means; and including:
   (b) support means in alignment with said infeed conveyor means and said outfeed conveyor means and located in said gap between said infeed conveyor means and said outfeed conveyor means adapted to support a bale during wrapping of the bale and having a smooth, curved shape adaptable for continuous sliding of both a bale and the weather resistant material therealong without substantially disturbing the material wrapped about a bale as the bale is transferred to said outfeed conveyor means.

5. The apparatus of claim 4 wherein:
   (a) said support means are mounted on a front section of said frame.

6. The apparatus according to claim 5 wherein said support means include:
   (a) first and second smooth support bars spanning a substantial portion of said gap between said infeed conveyor means and said outfeed conveyor means and having ends that are spaced from said outfeed conveyor means to allow said web material to slide from under said support bars.

7. The apparatus according to claim 1 wherein said wrapping means includes:
   (a) a rotatable generally ring shaped cage adapted to receive bales therethrough;
   (b) drive means for rotating said cage; and
   (c) film dispensing and stretching means mounted on said cage.

8. The apparatus according to claim 7 wherein said film dispensing and stretching means includes:
   (a) first and second film dispensers, each of said dispensers having a film stretching mechanism cooperating therewith.

9. The apparatus according to claim 1 wherein said frame includes:
   (a) a drive axle;
   (b) wheel means connected to said drive axle; and
   (c) a towing device attached to said frame and adapted to inactivate said drive axle and raise said outfeed conveyor means and wheel means during towing of said apparatus.

10. An apparatus for wrapping hay bales comprising:
   (a) an elongate frame adapted to hold a plurality of bales thereon;
   (b) infeed conveyor means mounted on said frame for receiving unwrapped bales and transporting therealong;
   (c) bale wrapping means adjacent to said infeed conveyor means mounted on said frame; said infeed conveyor means operatively urging bales therefrom into and through said bale wrapping means; said wrapping means being adapted to wrap a web of weather resistant material about and between adjacent bales so as to form a continuous weather resistant cocoon about adjacent bales;
   (d) outfeed conveyor means mounted on said frame adapted to receive wrapped bales from said wrapping means and to transport wrapped bales to the ground in generally end-to-end relationship;
   (e) support means located between said infeed conveyor means and said outfeed conveyor means adapted to hold a bale during wrapping of the bale;
   (f) wheel means for mobily supporting said frame;
   (g) first drive means for propelling said frame in a forward direction in front of the already wrapped bales and synchronized to the speed of said outfeed conveyor so as to be adapted to discharge bales onto the ground in generally close end-to-end relationship; said first drive means also propelling said outfeed conveyor;
   (h) second drive means for propelling said infeed conveyor;
   (i) third drive means for propelling said bale wrapping means; and
   (j) control means for independently operating said first, second and third drive means.

11. The apparatus according to claim 10 wherein said infeed conveyor means includes:
   (a) triggering means located near said infeed conveyor means adapted to automatically start said infeed conveyor means when a bale is placed on said infeed conveyor and to stop said infeed conveyor means when all bales have been conveyed past said triggering means.

12. The apparatus according to claim 10 wherein said infeed conveyor means includes:
   (a) first and second parallel elongate rails extending toward said bale wrapping means; and
   (b) first and second slip chains mounted respectively on said first and second rails and adapted to rotate therearound.

13. The apparatus according to claim 12 wherein said triggering means includes:
   (a) an elongate trigger plate located between said first and second parallel elongate rails and connected to said second drive means; said trigger plate extending upwardly relative to said rails when there are no bales on said rails and downwardly relative to said rails when a bale is placed thereon, thereby setting said infeed conveyor means in motion.

14. The apparatus according to claim 12 wherein said support means includes:
   (a) first and second support bars mounted onto and extending from said first and second rails respectively and spanning substantially between said rails and said outfeed conveyor means.

15. The apparatus according to claim 10 wherein said bale wrapping means includes:
   (a) a rotatable cage having first and second spaced circular members positioned generally perpendicularly relative to the path of travel of a bale through said apparatus and adapted to allow passage of bales therethrough while encircling said support means;

(b) a plurality of strut cross members fixedly attaching said first circular member to said second circular member;

(c) roller means mounted on said frame; said first and second circular members slidably mounted on said roller means and rotatable thereon;

(d) drive means for propelling at least one of said roller means;

(e) first and second film dispensing and stretching mechanisms oppositely mounted on said cage and generally located between said first and second circular members.

16. The apparatus according to claim 15 wherein said first and second film dispensing and stretching mechanisms each include:

(a) a detachable film dispenser roller;

(b) an upstream roller in spaced relation to said film dispenser; and (c) a downstream roller in spaced relation and connected to said upstream roller; said upstream roller being operably rotated by a continuous sheet of film being drawn over the roller from a roll of film mounted on said dispenser roller; said sheet in contact with both said upstream and downstream rollers; rotation means to make said upstream and downstream rollers rotate at different surface velocities; said downstream roller rotating faster than said upstream roller causing the film between said upstream and downstream rollers to stretch prior to being wrapped on a bale.

17. The apparatus according to claim 10 including:

(a) a ramp pivotally connected to said outfeed conveyor means;

(b) a drive axle connected to said frame;

(c) wheel means connected to said axle;

(d) a towing device attached to said frame and adapted to inactivate said axle and raise said outfeed conveyor means, ramp and wheel means during towing of said vehicle.

18. An apparatus for wrapping hay bales comprising:

(a) an elongate vehicle having a frame adapted to hold a plurality of bales thereon; said frame having mounted thereon a drive axle and having wheel means connected to said axle and steering means for guiding said wheel means;

(b) first drive means for propelling said vehicle;

(c) an infeed conveyor mounted on said frame and adapted to receive unwrapped bales; said infeed conveyor having:

(1) first and second parallel elongate rails; and (2) first and second slip chains mounted respectively on said first and second rails and adapted to rotate therearound;

(3) second drive means to rotate said slip chains; and (4) an elongate trigger plate located between said first and second parallel rails and operably connected to said second drive means; said trigger plate biased upward when there are no bales thereon and urged downward by a bale when a bale is placed thereon, thereby engaging said drive means and rotating said chains;

(c) bale wrapping means adjacent to said infeed conveyor means; said bale wrapping means including:

(1) a rotatable cage having first and second circular members positioned generally perpendicular to a path of travel through said apparatus;

(2) roller means; said first and second circular members mounted on said roller means so as to be rotatable thereon;

(3) third drive means for rotating said cage on said roller means;

(4) first and second film dispensing and stretching mechanisms oppositely mounted on said cage; each of said film dispensing and stretching mchanisms including:

(i) a film dispenser roller;

(ii) an upstream roller in spaced relation to said film dispenser; and (iii) a downstream roller in spaced relation and connected by a belt to said upstream roller; said upstream roller being rotated by a continuous sheet of film from a roll of film mounted on said dispenser roller being drawn over the upstream idler; said sheet in contact with both said upstream and downstream rollers; said downstream roller being driven by said belt to rotate faster than said upstream roller causing the film between said rollers to stretch prior to being wrapped on a bale;

(d) outfeed conveyor means adjacent to said bale wrapping means adapted to transport bales from said wrapping means to a ramp pivotally connected thereto and extending to the ground; said first drive means propelling said outfeed conveyor means;

(e) first and second smooth bars mounted extending from said first and second rails and generally spanning between said rails and said outfeed conveyor means;

(f) a towing device pivotally attached to said outfeed conveyor means adapted to extend laterally from said vehicle while hay bales are being wrapped and to extend rearwardly from said apparatus during towing of said vehicle.

* * * * *